US010207205B2

(12) United States Patent
Shrivastava et al.

(10) Patent No.: US 10,207,205 B2
(45) Date of Patent: Feb. 19, 2019

(54) CYLINDRICAL FILTER SCREEN WITH TENSIONING MECHANISM

(71) Applicant: Dow Global Technologies LLC, Midland, MI (US)

(72) Inventors: Abhishek Shrivastava, Edina, MN (US); George D. Caffell, Moss Beach, CA (US); Thomas W. Stroud, Newark, CA (US); David A. Voth, San Jose, CA (US); Tanya K. Krueger, San Jose, CA (US); Scott T. Burr, Midland, MI (US); Gerald Drouin Corcoran, Santa Clara, CA (US); John H. Mallard, Stratton, VT (US); Michael J. Vosberg, San Carlos, CA (US)

(73) Assignee: Dow Global Technologies LLC, Midland, MI (US)

( * ) Notice: Subject to any disclaimer, the term of this patent is extended or adjusted under 35 U.S.C. 154(b) by 73 days.

(21) Appl. No.: 15/525,535

(22) PCT Filed: Nov. 24, 2015

(86) PCT No.: PCT/US2015/062367
§ 371 (c)(1),
(2) Date: May 9, 2017

(87) PCT Pub. No.: WO2016/099822
PCT Pub. Date: Jun. 23, 2016

(65) Prior Publication Data
US 2017/0368481 A1  Dec. 28, 2017

Related U.S. Application Data

(60) Provisional application No. 62/093,447, filed on Dec. 18, 2014.

(51) Int. Cl.
*B01D 21/26* (2006.01)
*B01D 36/04* (2006.01)
(Continued)

(52) U.S. Cl.
CPC ....... *B01D 21/267* (2013.01); *B01D 29/0018* (2013.01); *B01D 29/112* (2013.01);
(Continued)

(58) Field of Classification Search
CPC .......... B01D 21/267; B01D 2201/4084; B01D 29/018; B01D 29/0018; B01D 29/112; B01D 36/045; B04C 5/04; B04D 5/081
(Continued)

(56) References Cited

U.S. PATENT DOCUMENTS

| 431,448 A | 7/1890 | Dixon |
| 1,107,485 A | 8/1914 | Bowser |

(Continued)

FOREIGN PATENT DOCUMENTS

| CN | 102563205 A | 7/2012 |
| DE | 198913709 | 4/1990 |

(Continued)

*Primary Examiner* — Claire A Norris
(74) *Attorney, Agent, or Firm* — Kenneth Crimaldi

(57) ABSTRACT

A filter assembly including a filter screen (27) comprising a band (27') of porous material extending between two axially aligned opposing ends (38, 38') and defining a cylindrical periphery (29), wherein the ends (38, 38') are each secured to a dynamic tensioning mechanism (46) that permits the ends (38, 38') to move bi-directionally relative to one another about the periphery (29) of the filter screen (27).

6 Claims, 6 Drawing Sheets

(51) Int. Cl.
- B01D 29/11 (2006.01)
- B01D 29/00 (2006.01)
- B04C 5/04 (2006.01)
- B04C 5/081 (2006.01)
- B04C 9/00 (2006.01)

(52) U.S. Cl.
CPC .............. *B01D 36/045* (2013.01); *B04C 5/04* (2013.01); *B04C 5/081* (2013.01); *B01D 2201/0461* (2013.01); *B01D 2201/18* (2013.01); *B01D 2201/4084* (2013.01); *B01D 2201/583* (2013.01); *B04C 2009/004* (2013.01)

(58) Field of Classification Search
USPC ........................ 210/232, 495, 304, 360.1, 787
See application file for complete search history.

(56) References Cited

U.S. PATENT DOCUMENTS

| | | | |
|---|---|---|---|
| 1,919,653 A | 7/1933 | Hill | |
| 2,706,045 A | 4/1955 | Large | |
| 2,788,087 A | 4/1957 | Lenehan | |
| 2,917,173 A | 12/1959 | Rakowsky | |
| 3,061,098 A | 10/1962 | Brezinski | |
| 3,219,186 A | 11/1965 | Polhemus et al. | |
| 3,285,422 A | 11/1966 | Wiley | |
| 3,529,544 A | 9/1970 | Oki | |
| 3,529,724 A | 9/1970 | Maciula et al. | |
| 3,822,533 A | 7/1974 | Oranje | |
| 3,893,914 A | 7/1975 | Bobo | |
| 3,947,364 A | 3/1976 | Laval, Jr. | |
| 4,062,766 A | 12/1977 | Duesling | |
| 4,085,050 A | 4/1978 | Gervasi | |
| 4,120,783 A | 10/1978 | Baummer | |
| 4,146,468 A | 3/1979 | Wilson | |
| 4,159,073 A | 6/1979 | Liller | |
| 4,178,258 A | 12/1979 | Papay et al. | |
| 4,216,095 A | 8/1980 | Ruff | |
| 4,298,465 A | 11/1981 | Druffel | |
| 4,414,112 A | 11/1983 | Simpson et al. | |
| 4,470,904 A | 9/1984 | Gail et al. | |
| 4,575,406 A | 3/1986 | Slafer | |
| 4,596,586 A | 6/1986 | Davies et al. | |
| 4,608,169 A | 8/1986 | Arvanitakis | |
| 4,651,540 A | 3/1987 | Morse | |
| 4,662,909 A | 5/1987 | Durr | |
| 4,698,156 A | 10/1987 | Bumpers | |
| 4,865,751 A | 9/1989 | Smisson | |
| 4,931,180 A | 6/1990 | Darchambeau | |
| 5,042,998 A | 8/1991 | Beusen | |
| 5,104,520 A | 3/1992 | Maronde et al. | |
| 5,116,516 A | 5/1992 | Smisson | |
| 5,183,568 A | 2/1993 | Lescovich | |
| 5,188,238 A | 2/1993 | Smisson et al. | |
| 5,209,845 A | 5/1993 | Sims | |
| 5,227,061 A | 7/1993 | Bedsole | |
| 5,277,705 A | 1/1994 | Anderson et al. | |
| 5,407,584 A | 4/1995 | Broussard, Sr. | |
| 5,466,384 A | 11/1995 | Prevost et al. | |
| 5,478,484 A | 12/1995 | Michaluk | |
| 5,593,043 A | 1/1997 | Ozmerih | |
| 5,879,545 A | 3/1999 | Antoun | |
| 5,972,215 A | 10/1999 | Kammel | |
| 6,110,242 A | 8/2000 | Young | |
| 6,117,340 A | 9/2000 | Carstens | |
| 6,200,467 B1 | 3/2001 | Nagaoka | |
| 6,210,457 B1 | 4/2001 | Siemers | |
| 6,238,579 B1 | 5/2001 | Paxton et al. | |
| 6,251,296 B1 | 6/2001 | Conrad et al. | |
| 6,511,599 B2 | 1/2003 | Jaroszczyk et al. | |
| 6,531,066 B1 | 3/2003 | Saunders et al. | |
| 6,613,231 B1 | 9/2003 | Jitariouk | |
| 6,790,346 B2 | 9/2004 | Caleffi | |
| 6,875,364 B2 | 4/2005 | Gordon | |
| 6,896,720 B1 | 5/2005 | Arnold et al. | |
| 7,166,230 B2 | 1/2007 | Nilsen et al. | |
| 7,241,382 B2 | 6/2007 | Gordon | |
| 7,316,067 B2 | 1/2008 | Blakey | |
| 7,351,269 B2 | 4/2008 | Yau | |
| 7,632,416 B2 | 12/2009 | Levitt | |
| 7,651,000 B2 | 1/2010 | Knol | |
| 7,785,479 B1 | 8/2010 | Hosford | |
| 7,896,169 B2 | 3/2011 | Levitt et al. | |
| 7,998,251 B2 | 8/2011 | Pondelick et al. | |
| 8,201,697 B2 | 6/2012 | Levitt et al. | |
| 8,307,993 B2 | 11/2012 | Yoshida | |
| 8,308,953 B2 | 11/2012 | Lee | |
| 8,663,472 B1 | 3/2014 | Mallard et al. | |
| 8,701,896 B2 | 3/2014 | Levitt et al. | |
| 8,882,999 B2 | 11/2014 | Levitt et al. | |
| 8,936,161 B2 | 1/2015 | Kimura | |
| 8,960,450 B2 | 2/2015 | Caffell et al. | |
| 8,978,697 B2 | 3/2015 | Hoppe et al. | |
| 9,050,610 B2 | 6/2015 | Caffell et al. | |
| 9,101,859 B2 | 8/2015 | Jons et al. | |
| 9,186,604 B1 | 11/2015 | Jons et al. | |
| 9,192,946 B2 | 11/2015 | Ramalingam et al. | |
| 9,527,091 B2 | 12/2016 | Corcoran et al. | |
| 2003/0029790 A1 | 2/2003 | Templeton | |
| 2003/0221996 A1 | 12/2003 | Svoronos et al. | |
| 2004/0211734 A1 | 10/2004 | Moya | |
| 2005/0109684 A1 | 5/2005 | DiBella et al. | |
| 2007/0039900 A1 | 2/2007 | Levitt | |
| 2007/0075001 A1 | 4/2007 | Knol | |
| 2008/0197077 A1 | 8/2008 | Swartley et al. | |
| 2011/0220586 A1 | 9/2011 | Levitt | |
| 2011/0226204 A1* | 9/2011 | Hoppe ................. B01D 29/014 123/90.17 |
| 2012/0010063 A1 | 1/2012 | Levitt et al. | |
| 2012/0145609 A1 | 6/2012 | Caffell et al. | |
| 2012/0160762 A1 | 6/2012 | Kimura | |
| 2014/0042083 A1 | 2/2014 | Mallard et al. | |

FOREIGN PATENT DOCUMENTS

| | | |
|---|---|---|
| DE | 4308685 | 4/1994 |
| DE | 4420760 | 5/1995 |
| DE | 19914674 | 12/2000 |
| DE | 10001737 | 10/2001 |
| DE | 102005027509 | 12/2006 |
| EP | 0429409 | 5/1991 |
| EP | 0475252 | 3/1992 |
| EP | 0557258 | 8/1993 |
| EP | 0566792 | 10/1993 |
| EP | 2082793 | 7/2009 |
| EP | 2374518 A1 | 10/2011 |
| FR | 2791904 | 10/2000 |
| GB | 2007118 | 5/1979 |
| GB | 2309182 | 7/1997 |
| GB | 2423264 | 8/2006 |
| JP | 11276817 | 10/1999 |
| JP | 02995554 | 12/1999 |
| JP | 2006068690 | 3/2006 |
| KR | 2004105165 | 12/2004 |
| KR | 899416 | 5/2009 |
| WO | 2002018056 | 3/2002 |
| WO | 2004064978 | 8/2004 |
| WO | WO-2012154448 A1 * | 11/2012 ........... B01D 36/045 |

\* cited by examiner

CYLINDRICAL FILTER SCREEN WITH TENSIONING MECHANISM

FIELD

The invention is directed toward cylindrical filter screens, including those fabricated from flat stock material (e.g. "band") flexed into a cylindrical configuration.

INTRODUCTION

Cylindrical filter screens are used in a variety of filtration devices, including hydroclones as described in: U.S. Pat. No. 7,632,416, U.S. Pat. No. 7,896,169, U.S. Pat. No. 8,201,697, U.S. Pat. No. 8,663,472, U.S. Pat. No. 8,701,896, U.S. Pat. No. 8,882,999, US2012/0145609, US2014/0042083, WO2013/181028, WO2013/181029 and WO2014/066036, the entire subject matter of which is incorporated herein by reference. In a typical embodiment, the screen is fabricated from a rectangular flat metal band of porous material that is assembled by flexing the band so that its opposing ends abut or overlap to form a cylinder. The ends are permanently secured together by welding, adhesive, rivets, etc. The filter screen is supported by an underlying support frame. The support frame helps maintain the screen in a cylindrical configuration during operation. For reasons of cost and weight the support frame may be fabricated from a material different from that of the filter screen. Examples include polymers having linear coefficients of thermal expansion quite different than that of a metal filter screen. As a consequence, the support frame undergoes significant thermal expansion and contraction during operation. These thermal excursions can crack, craze or otherwise compromise the integrity of the filter screen.

SUMMARY

In one embodiment the invention includes a filter assembly including a filter screen (27) comprising a band (27') of porous material extending between two axially aligned opposing ends (38, 38') and defining a cylindrical periphery (29), wherein the ends (38, 38') are each secured to a dynamic tensioning mechanism (46) that permits the ends (38, 38') to move bi-directionally relative to one another about the periphery (29) of the filter screen (27). In another embodiment, the invention includes a hydroclone including the aforementioned filter screen (27). Many additional embodiments are described.

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

DETAILED DESCRIPTION

In one embodiment, the present invention includes a cylindrical filter assembly. While the subject filter assembly may be used in a variety of filtration devices, for ease of description the filter assembly is described in the context of a hydroclone. In another embodiment, the invention includes a hydroclone filtration device and related methods of conducting cyclonic separation. For purposes of the present description, the term "hydroclone" refers to a filtration device that at least partially relies upon centrifugal forces generated by vortex fluid flow to separate constituents of a fluid mixture. Examples include the separation of solid particles from a liquid mixture and separation of mixtures including liquids of differing densities (e.g. oil and water). Specific applications include the treatment of: pulp effluent generating by paper mills, process water generated by oil and gas recovery, bilge water and municipal and industrial waste water. Specific examples are described in the references listed in the Background section.

Figure 1A:
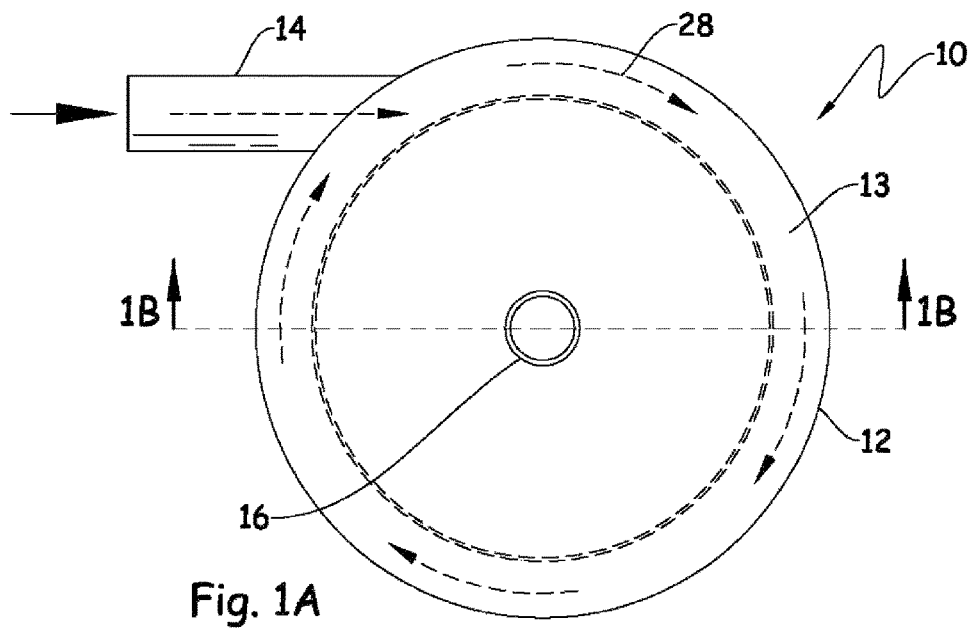
FIG. 1A an elevational view showing one embodiment of the invention.
Figure 1B:
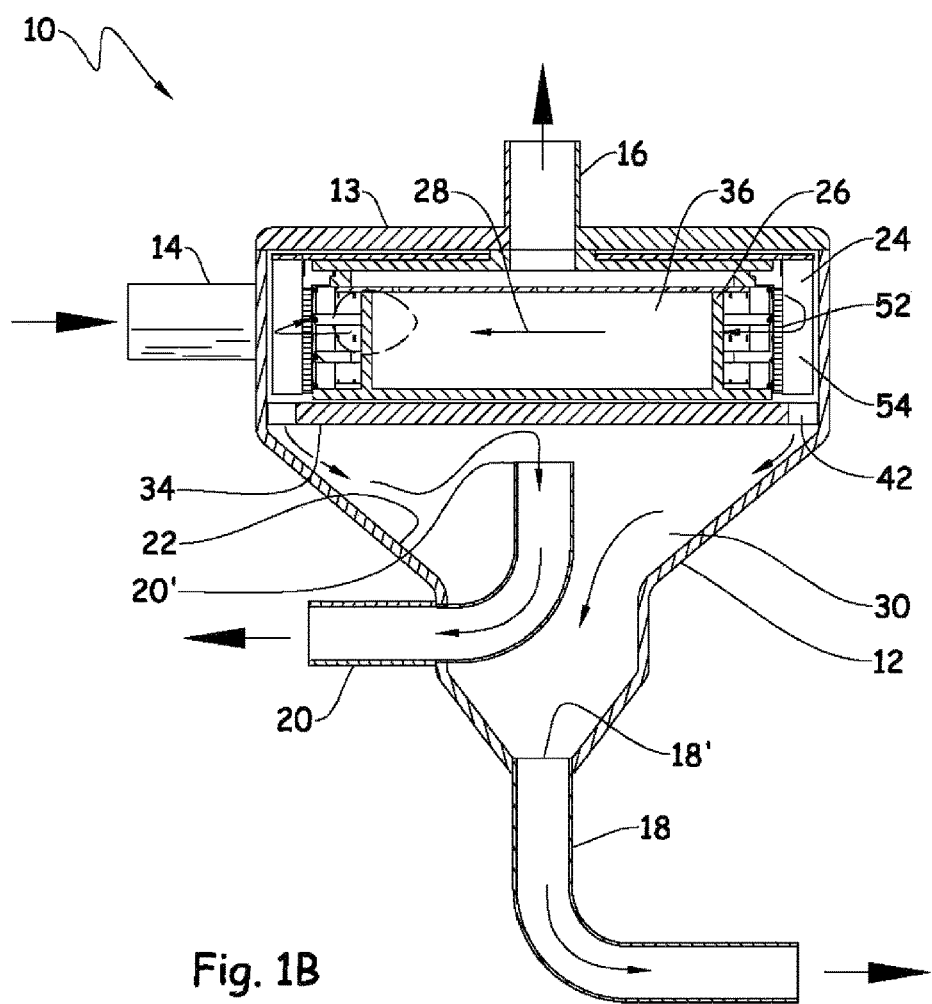
FIG. 1B is a cross-sectional view taken along lines 1B-1B of FIG. 1A.
Figure 2:
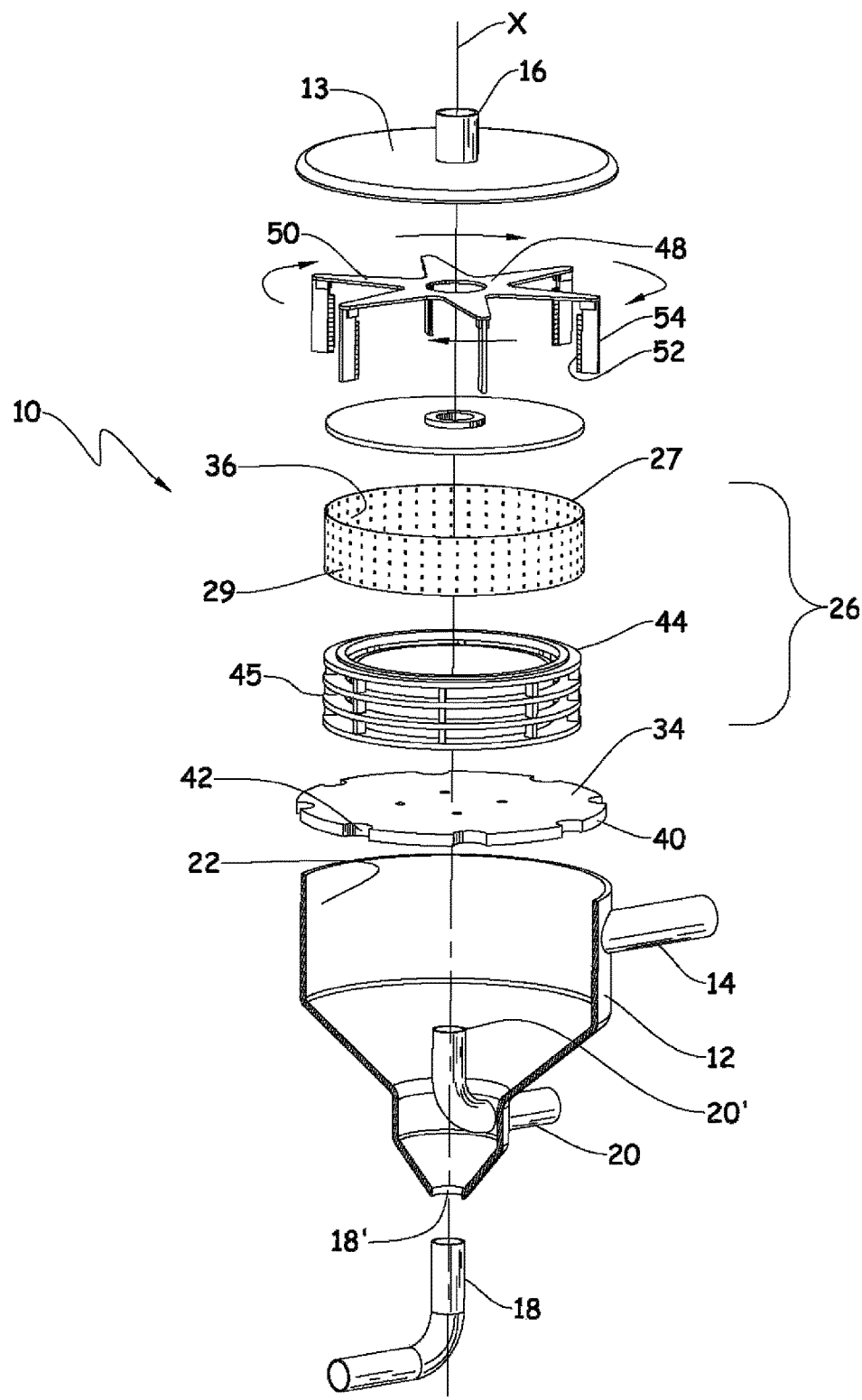
FIG. 2 is an exploded, partially cut-away perspective view of the embodiment shown in FIGS. 1 A and B.

One embodiment of the invention is illustrated in FIGS. 1-2 including a hydroclone generally shown at 10 including a tank (12) having a removable lid (13), a fluid inlet (14), a filtered fluid outlet (16), an effluent outlet (18), an optional process fluid outlet (20) and an inner peripheral wall (22) enclosing at least one, but preferably plurality of vertically aligned chambers (24, 30). While depicted as including two vertically aligned chambers (24, 30), additional chambers may also be included. Also, the chambers may alternatively be horizontally aligned. Similarly, additional fluid inlets and outlets may also be included. While shown as having a cylindrical upper section and a frustro-conical base centered about a central axis, the tank (12) may have other configurations including an entirely cylindrical shape.

A filter sub-assembly (26) is located within the chamber (24) (i.e. "vortex chamber") and comprises a circular filter screen (27) centered about an axis (X) and defining a periphery (29) concentrically located about the axis (X) and including a plurality of pores (32) passing therethrough. The filter screen (27) encloses a filtrate chamber (36) which is in fluid communication with the filtered fluid outlet (16). An optional effluent separation chamber (30) may be located below and in fluid communication with the vortex chamber (24). The effluent separation chamber (30) is adapted for receiving unfiltered fluid from the vortex chamber (24). An optional vortex flow barrier (34) may be located between the vortex and effluent separation chambers (24, 30) and may be adapted to direct fluid flow between the vortex and effluent separation (24, 30) chambers to locations adjacent to the inner peripheral wall (22) of the tank (12). The vortex flow barrier (34) may be designed to maintain vortex fluid flow in the effluent separation chamber (24) and disrupt vortex fluid flow (28) as fluid flows from the vortex chamber (24) into the effluent separation chamber (30). More specifically, the vortex flow barrier (34) includes an outer periphery (40) extending to locations adjacent to or in contact with the inner peripheral wall (22) of the tank (12) and may further include a plurality of apertures (42) located near the periphery (40) and extending therethrough. In the illustrated embodiment, the apertures (42) are scalloped-shaped but alternative shapes may also be used. An effluent opening or pathway (e.g. pipe) (18') is centrally located in the lower portion of the tank (12) and is in fluid communication with the effluent outlet (18) by which effluent may exit the tank (12). While not shown, the opening (18') or outlet (18) may optionally include a valve (e.g. one-way check valve) for selectively permitting effluent to flow from the tank (12).

In operation, pressurized feed fluid (e.g. preferably from 4 to 120 psi) enters the tank (12) via the fluid inlet (14) and follows along fluid pathway (28) and generates a vortex about the filter sub-assembly (26). Centrifugal forces urge denser materials toward the inner peripheral wall (22) of the tank (12) while less dense liquid flows radially inward toward the filter screen (27). A portion of this liquid flows through the pores (32) of the filter screen (27) into the filtrate chamber (36) and may exit the tank (12) as "filtrate" by way of the filtered fluid outlet (16). The remaining "non-filtrate" flows downward from the vortex chamber (24) to the effluent separation chamber (30). The vortex flow barrier (34) directs the majority (e.g. preferably at least 75% and in some embodiments at least 90%) of such downward flow to locations along or adjacent to an inner peripheral wall (22) of the tank (12). This arrangement is believed to help maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the bottom of the tank (12) and then may enter the effluent opening (18') and may then exit the tank by way of effluent outlet (18). The remaining liquid (hereinafter referred to as "process fluid") in the effluent separation chamber (30) flows upward into a centrally located process fluid opening or pathway (e.g. pipe) (20') in fluid communication with the process fluid outlet (20). In most applications, process fluid represents a mid-grade product that may be re-used, disposed of or recycled back to the fluid inlet (14) for further treatment. "Filtrate" typically represents a high grade product that may be disposed of or re-used. "Effluent" represents a low grade product that may be disposed of or further treated. However, it should be appreciated that in some applications, effluent may represent a valuable product.

The feed fluid inlet pressure and spacing between the periphery (29) of the filter sub-assembly (26) and the inner peripheral wall (22) of the tank (12) may be optimized to create and maintain a vortex fluid flow within the vortex chamber (24). In order to further facilitate the creation and maintenance of vortex fluid flow, the fluid inlet (14) preferably directs incoming feed fluid on a tangential path about the vortex chamber (24), as indicated by dotted arrows in FIG. 1A.

As shown in FIGS. 1-2, the filter sub-assembly (26) is preferably centrally located within the vortex chamber (24) and evenly spaced from the inner peripheral wall (22) of the tank (12). While shown as being cylindrical, other configurations may be used including conical shaped filters. The hydroclone (10) further includes a cleaning assembly (48) for removing debris from the periphery (29) of the filter screen (27). The cleaning assembly (48) may be mounted on the top surface of the filter sub-assembly (26) and includes one or more spokes (50) extending radially outward. A cleaning member (52), (e.g. nylon or brass brush) extends downward from the end of the spoke (50) and engages the periphery (29) of the filter screen (27). While shown as a brush (52), alternative cleaning members may be used, e.g. wipers, blades, rollers, squeegees, scrapers, etc. From 2 to 60 cleaning members, and more preferably from 6 to 24 cleaning members are used. As represented by curved arrows in FIG. 2, the cleaning assembly (48) rotates about filter sub-assembly (26) such that the brushes (52) sweep the periphery (29) of the screen (27) and remove debris. One or more paddles (54) may be mounted to the end of at least one spoke (50) such that fluid flowing into the vortex chamber (24) rotates the cleaning assembly (48) about the filter sub-assembly (26). Spacing paddles (54) evenly about the filter sub-assembly (26) adds stability to the rotating movement of the cleaning assembly (48) and may help maintain vortex fluid flow in the vortex chamber (24). The paddles (54) and/or cleaning members (52) may lay normal to the periphery (29) of the filter screen (27), or may be slanted, (e.g. from −5° to −30° or 5° to 30° from the radial axis). Bearings may be used between the filter and cleaning assemblies (26, 48) to further facilitate rotation without impeding vortex fluid flow. In alternative embodiments not shown, the cleaning assembly (48) may be driven by alternative means, e.g. electronic motor, magnetic force, etc.

Figure 3A:
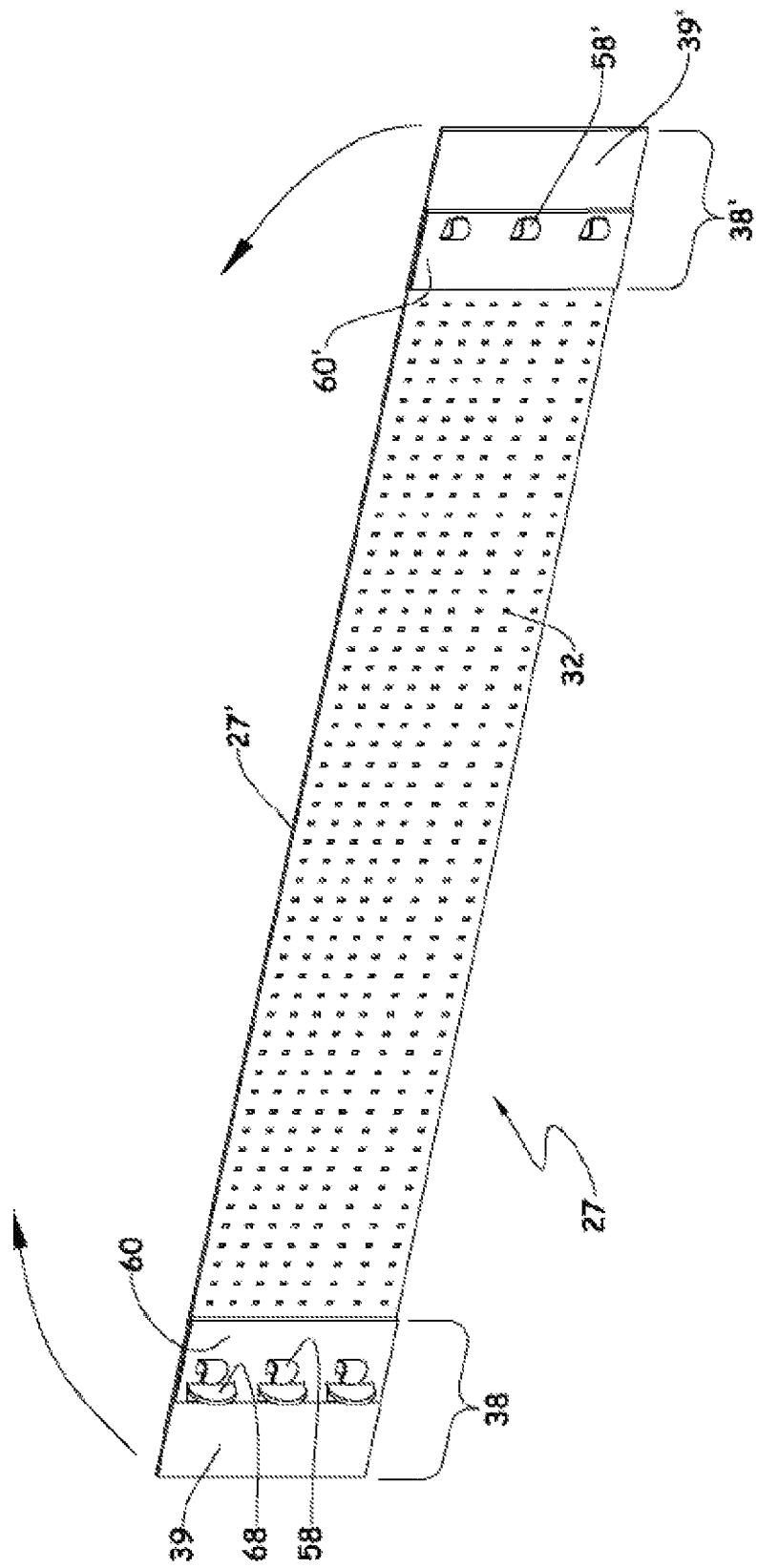
FIG. 3A is a perspective view showing the filter screen prior to assembly.

FIG. 3A illustrates an embodiment of an unassembled filter screen (27). In this embodiment, the filter screen (27) is fabricated from a rectangular flat band (27') of porous material extending between two opposing ends (38, 38'). As used herein, the term "ends" refers to outermost 100 mm of the band (27'), i.e. the portion extending to the longitudinal (length direction) edge of the band. The band (27') preferably has a thickness of from 10 to 1000 μm but preferably from 100 to 300 μm and may be selected from a wide variety metals such electro-formed nickel and stainless steel. The band (27') includes a plurality of pores (32), the shape of which is not particularly limited, (e.g. V-shape, cylindrical, slotted, mesh, etc.) and may vary depending upon the specific application. The pores (32) preferably cover more than 50% and more preferably more than 90% of the surface of the filter screen and may be of varying or uniform size having average sizes from 1 to 250 μm and more preferably 5 to 200 μm as measured by SEM. In one preferred embodiment, the pores (32) are axially aligned slots (with respect to axis X shown in FIG. 2) with widths no greater than 100 μm, and more preferably no greater than 50 μm, (e.g. 1-100 μm, more preferably 5μ to 50 μm). The filter screen (27) is assembled by flexing the band (27') into a cylindrical configuration such that the ends (38, 38') of the band (27') are drawn toward each other, axially aligned, preferably with one end (38) overlapping the other (38'), e.g. (from 10 to 100 mm). The radially inner surface (39) of the overlapping end (38) and/or radially outer surface (39') of underlapping end (38') may optionally include a low friction coating or covering (e.g. lubricant, PTFE tape, etc.) preferably having a coefficient of friction less than 0.3 and more preferably less than 0.1 (as measured by ASTM G115-10 (2013)). The low friction surfaces facilitate movement of the ends (38, 38') across one another. The combined thickness of the overlapping ends (38, 38') is preferably less than 0.5 mm thick. In an alternative embodiment not shown, the ends (38, 38') are drawn toward each other to form a cylinder but are separated by an axial gap which is bridged by a separate strip of material extending axially along the outer periphery (29) of the filter screen (27).

Figure 3B:
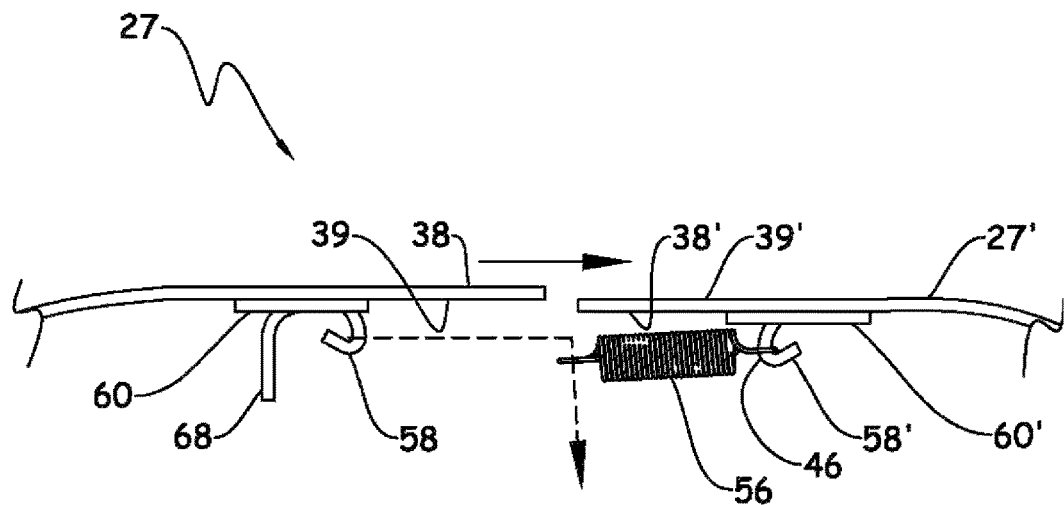
FIGS. 3B and 3C are elevational views showing an embodiment of the filter screen during assembly and after assembly.
Figure 3C:
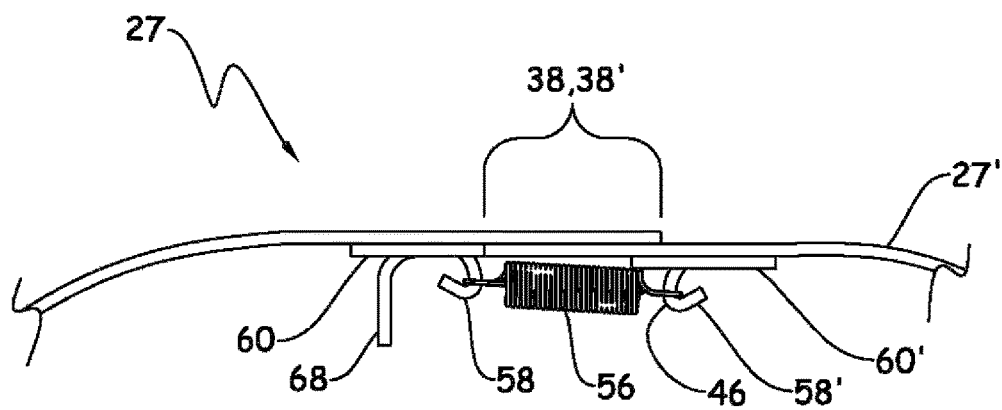
Figure 3D:
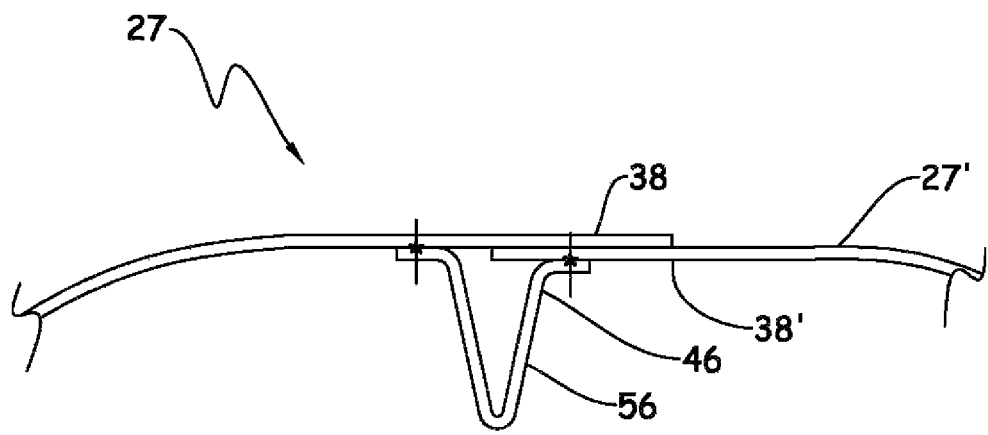
FIGS. 3D and 3E are elevational views of alternative embodiments of the filter screen.

As best shown in FIGS. 3B, 3C, 3D and 3E, the ends (38, 38') are secured together by way of a dynamic tensioning mechanism (46) that permits the ends (38, 38') to move bi-directionally relative to one another about the circumference of the screen's cylindrical periphery (29). The tensioning mechanism (46) includes at least one spring (56) secured to each end (38, 38') of the band (27'). The term "spring" as used herein refers to an elastic object that stores mechanical energy. While classic steel tension coil springs may be used (as shown in FIGS. 3B and 3C, and 4A and 4B), other materials of construction (e.g. rubber bands, etc.) and designs may also be used (see for example a cantilever type spring in FIG. 3D). The means for securing the spring (56) to the ends (38, 38') are not particularly limited (e.g. adhesive, welding, rivet, etc.) but one preferred embodiment allows for reversible attachment and detachment so that the spring (56) may be install, uninstalled, re-installed or replaced without damaging the filter screen (27) and preferably without the use of specialized tools. In one embodiment, the securing means includes a clasp (58, 58') (e.g. tab, hook, etc.) extending radially inward from each end (38, 38'). The shape of the clasp (58, 58') is not particularly limited and may be configured to easily engage with the ends of the spring (56). For example, a tension coil or "helical" spring typically includes loops or a hook feature allowing reversible attachment with a clasp. The clasps (58, 58') may be directly attached to the ends (38, 38') of the filter screen (27), or may be affixed to mounting plates (60, 60') which are in turn secured to the ends (38, 38'). The technique for securing the mount plates to the band (27') is not particularly limited and includes welding, bonding and riveting. FIGS. 3B and 3C are elevational views of a preferred embodiment showing the filter screen unassembled and assembled, respectively. FIG. 4A is a perspective view of the embodiment of FIG. 3C.

Figure 3E:
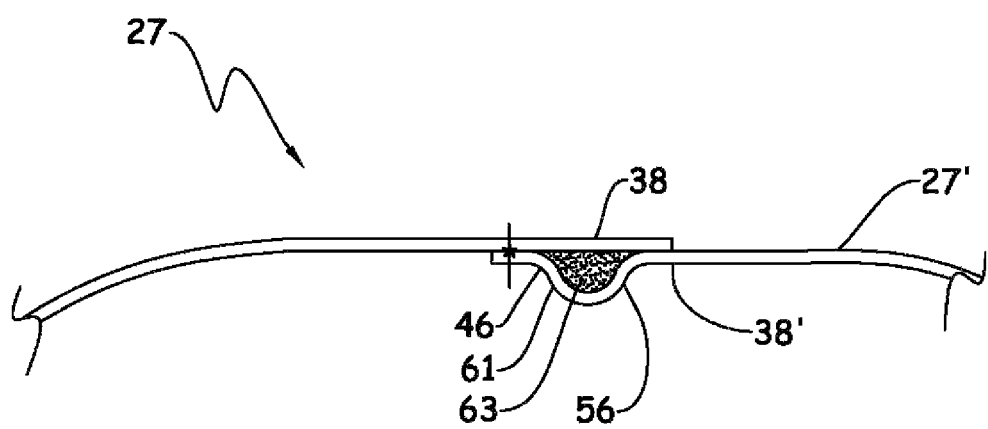
Figure 4A:
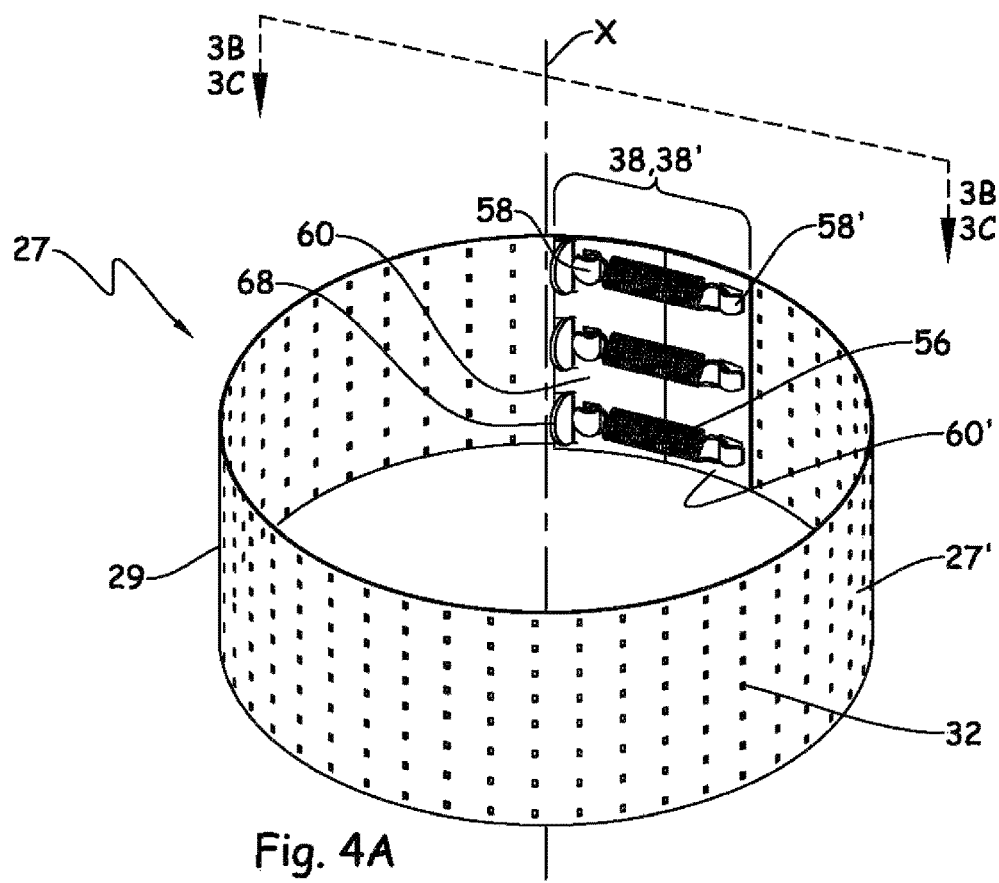
FIG. 4A is perspective view of the embodiment shown in FIG. 3C.

FIG. 3E illustrates another embodiment of the filter screen (27') wherein the ends (38, 38') of the band (27') are secured together by way of a dynamic tensioning mechanism (46) that permits the ends (38, 38') to move bi-directionally relative to one another about the circumference of the screen's cylindrical periphery (29). In this embodiment, the tensioning mechanism (46) comprises an integral spring (56) formed by crimping a portion of an end (38') of the band to form an axially aligned and flexible channel (61). The underlying end (38') is directly secured to the overlapping end (38), e.g. by way of welding, bonding, etc. While the ends (38, 38') remain fixed at their common point of attachment, the integral spring (56) allows for relative movement between the ends (38, 38') by flexing, e.g. the channel (61) may reversibly flatten in response to radially outward forces and return to its original shape as radial forces diminish (e.g. in response to reduced temperatures). A support (63) may be included within the channel (61) to provide a fluid seal at the overlapping interfaces between the ends (38, 38'). Applicable support materials include polymeric foams, flexible adhesives, etc.

Figure 4B:
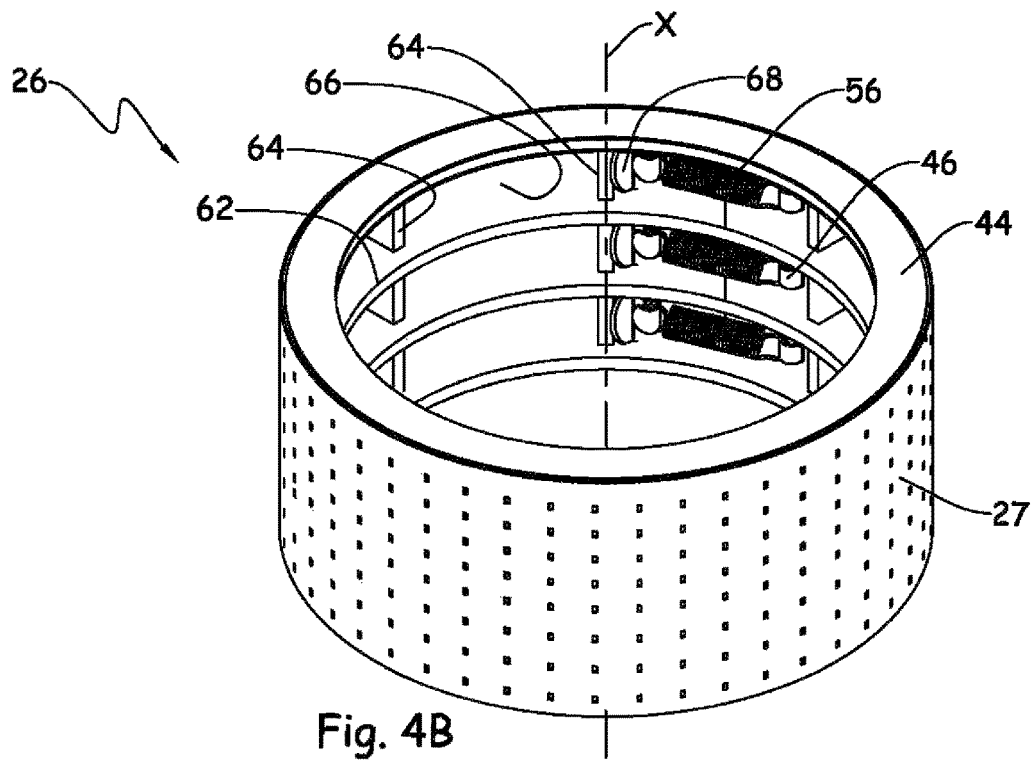
FIG. 4B is a perspective view of the embodiment shown in FIG. 4A including the filter screen assembled about a support frame.

A filter sub-assembly (26) is shown in FIG. 4B including the filter screen (27) supported by an underlying support frame (44). The support frame (44) helps maintain the screen (27) in a cylindrical configuration during operation. In the illustrated embodiment, the support frame (44) is a cylindrical grid of circular ribs (62) and axial supports (64) which defines a cylindrical outer periphery (45) (best shown in FIG. 2). The filter screen is mounted concentrically about the outer periphery (45) of the frame (44). The support frame (44) is fabricated from a material different from that of the filter screen (27). Examples include polymers (e.g. polycarbonate) that have linear coefficients of thermal expansion quite different than that of the filter screen (27). During operation, the frame (44) may undergo significant thermal expansion and contraction which can crack, craze or otherwise compromise the integrity of the filter screen (27). The tensioning mechanism (46) mitigates this effect by allowing the filter screen (27) to concentrically expand and contract with the support frame (44). For example, the expansion of the support frame (44), e.g. when exposed to heat, creates an outward radial force that expand the spring(s) (56) of the tensioning mechanism (46) and allows the ends (38, 38') of the filter screen (27) to move relative to one another to define a periphery (29) having an enlarged circumference. Similarly, upon cooling the support frame (44) radially contracts and the process is reversed. Throughout the process of expansion and contraction, the filter screen (27) is maintained in generally cylindrical configuration about the support frame (44).

The filter sub-assembly (26) may additionally include an anti-rotation mechanism that prevents the filter screen (27) from concentrically rotating about the support frame (44). The anti-rotation mechanism may include an interlocking feature such as slot (66) within the grid (62, 64) and a tab (68) extending radially inward from the inner periphery of the filter screen (27). When assembled, the tab (68) rest within the slot (66) and abuts against an axial support (64). With respect to the embodiment illustrated in FIGS. 3E and 4, the spring (56) may also serve as an anti-rotation mechanism by resting within the slot (66) and abutting against an axial support (64). In an alternative embodiment, the contact surfaces between the inner periphery of the filter screen (27) and outer periphery of the support frame (44), (e.g. support ribs (62)) may include a high friction coating or covering preferably having a coefficient of friction of at least 0.5 (as measured by ASTM G115-10 (2013)). The high friction coating reduces concentric rotation between the two peripheral surfaces.

The invention claimed is:

1. A filter assembly comprising a filter screen (27) comprising a band (27') of porous material extending between two axially aligned opposing ends (38, 38') which overlap each other from 10 to 100 mm and define a cylindrical periphery (29),
   wherein end (38) includes a radially inner surface (39) and end (38') has a radially outer surface (39') and wherein at least one of the inner surface (39) or outer surface (39') includes a low friction coating or covering having a coefficient of friction less than 0.3 as measured by ASTM G115-10 (2013),
   wherein the assembly is characterized by the ends (38, 38') being secured to a dynamic tensioning mechanism (46) that permits the ends (38, 38') to move bi-directionally relative to one another about the periphery (29) of the filter screen (27).

2. The filter assembly of claim 1 wherein the dynamic tension mechanism (46) comprises at least one spring (56) secured to each end (38, 38') of the band (27').

3. The filter assembly of claim 2 further comprising a clasp (58, 58') extending radially inward from each end (38, 38') of the band (27'), and wherein the spring (56) is secured to the clasps (58, 58').

4. The filter assembly of claim 3 further comprising mounting plates (60, 60') secured to the ends (38, 38') of the band, and wherein the clasps (58, 58') extend radially inward from the mounting plates (60, 60').

5. The filter assembly of claim 1 further comprising a support frame (44) comprising a cylindrical grid of circular ribs (62) and axial supports (64) which define a cylindrical outer periphery (45), and wherein the filter screen (27) is mounted concentrically about the outer periphery (45) of the frame (44).

6. The filter assembly of claim 1 further comprising a hydroclone (10) comprising:
- a tank (12) including a fluid inlet (14), a filtered fluid outlet (16), an effluent outlet (18) and an inner peripheral wall (22) enclosing at least one chamber (24);
- a filter sub-assembly (26) located within the chamber (24) and comprising a cylindrical filter screen (27) centered about an axis (X), wherein the filter screen (27) includes a plurality of pores (32) passing therethrough, and wherein the filter screen (27) encloses a filtrate chamber (36) in fluid communication with the filtered fluid outlet (16) such that fluid passing through the pores (32) enters the filtrate chamber (36) and may exit the tank (12) by way of the filtered fluid outlet (16); and
- a cleaning assembly (48) comprising at least one cleaning member (52) biased against and adapted to rotate about the periphery (29) of the filter screen (27).

\* \* \* \* \*